3,265,611
CATALYTIC CRACKING PROCESS WITH AN ATTRITION RESISTANT CATALYST COMPOSITE

Robert L. Flanders, San Anselmo, Calif., assignor to Chevron Research Company, a corporation of Delaware
No Drawing. Filed Jan. 21, 1964, Ser. No. 339,107
2 Claims. (Cl. 208—120)

This invention relates to the conversion of petroleum hydrocarbons by catalytic cracking and more particularly to a method for reducing catalyst losses incurred by impact breakage and abrasion of the catalyst surfaces.

In accordance with my prior invention jointly with F. M. Parker and H. E. Knowlton as set forth in U.S. Patent 3,030,300, the attrition resistance of catalysts in moving bed catalytic cracking processes is substantially increased by continually supplying the consummate mass particulate siliceous catalyst being circulated in the catalytic cracking system with a glazing composition which is capable of forming a glaze with the siliceous catalyst. Such attrition resistant glaze is discontinuous on the macrosurface of the catalyst particles and serves to decrease the breakage of catalyst particles into fines which are lost by rejection in the fines separators of the catalytic cracking system. Also, the treatment results in less erosion of the various catalyst transfer lines particularly at the points of impact where the moving catalyst is directed against a deflecting or wall surface.

While it is generally preferable to introduce the glaze-forming material with the liquid feed to the reactor unit of a catalytic cracking system, it is sometimes more convenient, particularly in established plants, to introduce the glazing as a dispersion in a gaseous stream.

In the course of many experiments conducted to improve the attrition resistance of particulate siliceous catalyst in a catalytic cracking operation, samples of an equilibrium catalyst mixture withdrawn from a moving bed catalytic cracking unit of the bucket lift type, which catalyst was composed of synthetic silica-alumina beads having an average diameter of about 0.13 inch and containing approximately 90% $SiO_2$ and 10% $Al_2O_3$, were variously treated as follows: a mixture of coke-free dry catalyst after regeneration and a glazing material in powdered form and composed of about 52% $CaCO_3$, 39% $Ca_3(PO_4)_2$ and 9% $MgO$ in an amount of 0.23% by weight of glazing material in the total mixture was introduced into a rotating muffle furnace capable of constantly turning the mixture. The mixture was heated at 1200° F. for about one hour and air was passed through the constantly turning mixture. In one experiment, the glazing material was added in dry form to the catalyst mixture and in another experiment the glazing material was wetted with a high boiling gas oil (about 20 cc. of oil per gram of powdered glazing material) before mixing with the catalyst. After the catalyst mixtures were so exposed, they were cooled and tested for resistance to loss by attrition. In making this test, 200 g. of glazed catalyst beads (as indicated above, the size being sufficient to be retained on a 10-mesh screen) were placed in a unit having a closed, cyclic path whereby the beads were reintroduced every few seconds during the test period into a rising air blast for discharge against the lower side of a steel plate having a dependent skirt portion serving to guide the beads into the lower portion of the unit for reintroduction into the air stream. Portions of the fines produced during the test were carried out with the escaping lift gases, while the remaining fines and other small catalyst fragments formed were separated as the beads remaining on a 10-mesh screen were segregated and weighed. The difference in weight between the original sample (200 g.) and that of the on-10-mesh material remaining at the conclusion of the run was then determined and compared with that experienced by the unglazed "control," in order to obtain a value for the percentage improvement in attrition loss. In the case of the mixture of catalyst and dry glazing material, there was little improvement in attrition loss. However, when the glazing material was first wetted with oil, a considerable improvement in attrition loss was obtained, namely, about 50%.

The foregoing indicates that the presence of oil is essential to the efficient and superior formation of a discontinuous glaze on the external macrosurface of the catalyst particles. While we do not wish to be bound by a theory of operation, the following two phenomena involving the presence of oil are offered by way of explanation: in one, the presence of oil brings about physical contacting or sticking of the glaze material to the catalyst macrosurface which, in turn, promotes the glaze formation (i.e., the oil acts at least in part as a fluxing agent). In another possible phenomenon, the oil serves to bring about an increase in the local surface temperature which otherwise would not be sufficiently high to cause much glaze formation without substantially more than local areas on the catalyst macrosurfaces reaching such high temperatures that the catalytic properties are adversely affected.

Therefore, when a gaseous stream is the carrier for introducing a dispersion of the glazing material into a catalytic cracking system, the attrition resistance of the circulating catalyst is further improved by following the procedure of the present invention in which the glazing material in finely divided form suitable for dispersion in the gaseous stream is wetted with relatively high boiling oil prior to dispersion in the gas stream. The improvement results from having the surface of the glazing material particles wet with oil during the dispersion in the gaseous stream so that such particles have an oil residue thereon when they contact the catalyst to be glazed. Preferably, the finely divided glazing material is admixed with an amount of oil sufficient to form a flowable mixture. However, excess dilution with oil is to be avoided, a concentration of at least 5% by volume of finely divided glazing material being preferred. The oil should be sufficiently high boiling so that it is not readily vaporized during storage but partially vaporizes upon contact with the external macrosurface of the catalyst. The residual oil serves as a source of combustible material which, upon burning, increases the local surface temperatures, thereby promoting the formation of an adherent, attrition-resistant glaze on said catalyst surfaces. Thus gas oils and such other heavy oils as boil above about 500° F. are used. Preferably the oil has a low pour point, i.e., below 0° F., for easy handling. The straight-run oils are preferred over cracking cycle stocks which are more unstable and tend to create handling problems. Cracked stocks also contain aromatic fractions which in turn are more difficult to handle in pumps with rubber parts. The glazing material is a finely divided powder suitable for dispersion in the flowing gaseous stream and preferably has a particle size below about 1 micron in average diameter. Suitably the mixture of oil and glazing material is aspirated into the flowing gas stream introduced into the circulating catalyst.

The improved process is particularly applicable when using the combustion air stream going to the regenerator as a means for introducing the glaze-forming material into the circulating catalyst. Although the catalyst in the regenerator at the point of introduction of combustion air usually will have a macrosurface active enough to form a glaze, much of the finely divided glaze-forming material will be lost with combustion flue gases or catalyst fines withdrawn from the regenerator, thus aggravating the dust plume problem from the flue gas stacks, unless the glaze-forming material is oil wet before dispersion in the combustion air stream. Thus in a preferred embodiment of the present invention, the attrition resistance of a mass of particulate siliceous cracking catalyst circulating through reaction and regeneration zones and attendant conduits in a moving bed catalyst system for catalytic cracking of petroleum hydrocarbon feeds, is improved by introducing into the regeneration zone as a dispersion in the combustion air stream employed for regenerating the catalyst, finely divided glaze-forming material which has been wetted with oil prior to dispersion in said combustion air stream.

In some catalytic cracking systems such as the so-called air lift TCC type, combustion air is introduced at a single point near the center of the bed of catalyst in the regenerator and the air flows upwards in counter-flow to the descending catalyst and also downwards in concurrent flow with the catalyst. In such systems the oil-wetted glazing material is dispersed in the combustion air stream going to the regenerator.

In other catalytic cracking systems, such as the Houdriflow type, the regenerator is divided into several, usually 2 or 3 but sometimes up to 10, different zones and the combustion air is introduced into the bottom of each of these zones for concurrent contact with the descending catalyst, the combustion gases being disengaged at the top of each such zone and the catalyst usually being cooled at the bottom of each zone by contact with cooling coils. In such a catalyst-cracking regenerator system, the oil-wetted glaze material is preferably added only to the combustion air introduced at the bottom of the top zone in the regenerator, since this permits a greater residence time for the resulting mixture of catalyst and glazing material in the presence of combustion gases.

When the glazing material in oil-wetted form is dispersed in the combustion air being introduced into the regenerator, improved attrition resistance is obtained through the positive formation on the external macro-surface of the catalyst of an adherent, discontinuous glaze or filigree-appearing glassy coating which protects the catalyst mass. A further important result is the decreased solids contents on the flue gases discharged from the regenerator. The oil on the surface of the finely divided glazing material will only be a small amount compared to the total mass of catalyst since the amount of glazing material added is very small. The amount of oil used to wet the glazing material is kept to a minimum since excessive amounts of oil introduced into the regenerator tend to reduce the coke burning capacity. Hence, the finely divided glazing material preferably forms at least 10–15% by volume of the admixture with oil for dispersion in the combustion air stream.

As indicated above, the glaze-forming material is continually supplied to the consummate mass of particulate siliceous catalyst being circulated in the catalytic cracking system in a small amount, namely from about 0.002 to 0.25% by weight on an average daily basis. The glazing material or additive composition is comprised of one or more boron, alkali metal or alkaline earth metal compounds of the type which are capable of combining with the silica and other elements of the catalyst composition to form a glaze at the elevated temperature conditions encountered, or which are capable of being converted to said compounds. The following compounds are representative of those which can be used either singly, or in any desired combination, to form the glazing composition for application to the catalyst particles: NaCl, $Na_2CO_3$, KCl, $K_2CO_3$, LiF, $Li_2SO_4$, $Cs_2CO_3$, $Rb_2CO_3$, $BeF_2$, $BeCl_2$, BeO, $BeCO_3$, MgO, $MgCl_2$, $MgSO_4$, $MgCO_3$, CaO, $Ca_3(PO_4)_2$, $CaF_2$, $CaCO_3$, Ca oleate, Ca naphthenate, Mg oxalate, Ca sulfonate, Na oleate, SrO, $SrCO_3$, $SrF_2$, $BaCl_2$, $BaCO_3$, BaO, Ba naphthenate, $B_2O_3$, $Na_2B_4O_7$, $$Na_2B_4O_7 \cdot 10H_2O$$

$Ca(BO_2)_2$, $CaB_4O_7$ and $Mg(BO_3)_2$. Also contemplated for use are suitable minerals such as, for example, comminuted limestone having at least 50% calcium carbonate and at least 10% magnesium carbonate such as found in dolomitic limestone. Additive compositions comprising mixtures of alkaline earth metal carbonates such as a mixture containing at least 1% magnesium carbonate and at least 30% calcium carbonate are sometimes preferred. A preferred class of additives is that made up of alkaline earth compounds and/or boron compounds which are free of halogen and alkali metal constituents. Particularly good results are obtained with $B_2O_3$, $CaCO_3$, $H_3BO_3$, $BaCO_3$ and compositions containing 1–25% MgO, 30–75% $CaCO_3$ and 25–50% $Ca_3(PO_4)_2$. For further details of the amount and nature of the glaze-forming materials, as well as the advantages from the formation of adherent, attrition-resistant glaze on the external macro-surface of the catalyst circulating in a catalytic cracking system, reference is made to U.S. Patent 3,030,300.

As an example of a preferred embodiment of the present invention, the process described above is applied to a Houdriflow type of moving bed catalytic cracking unit having two regenerator zones provided with combustion air streams entering the bottom of each zone, catalyst cooling means between the zones and drawoffs for the resulting combustion gases at the top of each regenerator zone as illustrated in the figure and described in Patent 3,030,300. In such a system, the catalyst mass (which, for example, can be composed of synthetic silica-alumina beads having an average diameter of about ⅛ inch and containing about 87% $SiO_2$ and 13% $Al_2O_3$) gravitates downwardly through the regenerator zones for counter-current contact with combustion air stream. In a typical unit operating with 24,000 b./d. feed rate, a catalyst inventory of 900 tons and a catalyst circulation rate of about 600 tons per hour, about 4.2M c.f. per hour of combustion air is injected into the regenerator and the resulting combustion gases are discharged as flue stack gases. Oil-wetted glazing material is added preferably only to the combustion air stream entering the bottom of the upper regenerator zone. Suitably a mixture of straight-run gas oil (boiling range of 500 to 800° F.) and about 10–15% by volume of a powdered glaze-forming composition is dispersed into the air combustion stream by injection or aspiration at a rate of 40 gallons per hour. The rate may be higher at the start of the addition of the glaze-forming composition and then decreased to a lower level as the catalyst reaches equilibrium. As indicated above, the glaze-forming composition, on an oil-free basis, is added to the catalyst at a rate of from 0.002 to 0.25% by weight per average day. The glaze-forming composition can, for example, be a mixture of 80% $Ca_3(PO_4)_2$ and 20% MgO. Other suitable additive compositions include, for example, a mixture containing 40% $Ca_3(PO_4)_2$, 50% $CaCO_3$ and 10% MgO, and a mixture of 80% $Ca_3(PO_4)_2$ and 20% $Mg(OH)_2$.

While in accordance with the present invention the oil-wetted glazing material is preferably added to the combustion air stream, in another embodiment of the present process the oil-wetted glazing material is dispersed in the vapor feed near the top of the reactor. The mixture of oil and glazing material can be dispersed in such vapor stream before or after it enters the reactor. Alternately, the oil-wetted glazing material can be injected into the downwardly flowing catalyst mass entering the reactor, preferably above the usual catalyst distributors which, together with the vapor feed stream, bring about a fairly uniform distribution of the glazing material throughout the mass of catalyst. If the mixture of oil and glazing material cannot be readily injected into the catalyst stream, such as at the bottom of the seal leg between the regenerator and the reactor sections, or at a peripheral downcomer at the bottom part of a conical catalyst distributor, the treating mixture is dispersed in the vapor feed stream at or near the top of the reactor. For example, in a catalytic cracking unit operating with a vapor feed of about 30,000 b./d., a catalyst inventory of about 600 tons and a catalyst circulation rate of about 500 tons per hour, the attrition resistance of the catalyst can be substantially improved by dispersing in said vapor feed about 1 barrel per hour of a mixture of oil such as a straight-run gas oil (boiling from about 500 to 850° F.) and the above described glazing material, the latter forming about 5% by volume of the mixture. The mixture can be injected into the vapor feed through a Venturi-type injector placed in the vapor feed line near the point of entry into the reactor, or sprayed into the hot vapor line through a conventional spray nozzle.

I claim:

1. In a process for improving the attrition resistance of a mass of particulate siliceous cracking catalyst circulating through reaction and regeneration zones and attendant conduits in a moving catalyst system for catalytic cracking of petroleum hydrocarbon feeds wherein a finely divided material capable of forming a glaze on the external macrosurface of said catalyst particles is introduced into the circulating catalyst as a dispersion in a gaseous stream, the improvement of minimizing the loss of said glaze-forming material and of increasing the local surface temperatures on the external macrosurface of the catalyst to promote the formation thereon of an adherent, attrition-resistant protective glaze, which comprises wetting the surface of the finely divided glaze-forming material with relatively high boiling oil prior to dispersion in said gaseous stream and introducing the thus wetted glaze-forming material as a dispersion in a gaseous stream under conditions whereby the particles of glaze-forming material have an oil residue thereon when they contact said catalyst.

2. In a process for improving the attrition resistance of a mass of particulate siliceous cracking catalyst circulating through reaction and regeneration zones and attendant conduits in a moving catalyst system for catalytic cracking of petroleum hydrocarbon feeds wherein a finely divided agent capable of forming a glaze on the macrosurface of said particles is introduced into the regeneration zone as a dispersion in the combustion air stream employed for regenerating the catalyst, the improvement of minimizing the loss of said glaze forming agent with catalyst fines withdrawn from the regenerator and of increasing the local surface temperatures on the catalyst to promote the formation of an attrition-resistant protective glaze on the external macrosurface of said catalyst particles, which comprises wetting the surface of the finely divided glaze forming agent with a relatively high boiling oil prior to dispersion in said combustion air stream and introducing the thus wetted glaze-forming agent as a dispersion in said gaseous combustion air stream under conditions whereby the particles of glaze-forming agent have an oil residue thereon when they contact said catalyst.

References Cited by the Examiner

UNITED STATES PATENTS 3,030,300   4/1962   Flanders et al. _____ 208—114
3,044,954   7/1962   Hirschler _____ 208—114

DELBERT E. GANTZ, *Primary Examiner.*

A. RIMENS, *Assistant Examiner.*